United States Patent [19]

Kano

[11] Patent Number: 6,006,947

[45] Date of Patent: Dec. 28, 1999

[54] INJECTION DRUG DISPENSING SYSTEM

[75] Inventor: Kunihiko Kano, Toyonaka, Japan

[73] Assignee: Kabushiki Kaisha Yuyama Seisakusho, Osaka, Japan

[21] Appl. No.: 09/046,642

[22] Filed: Mar. 24, 1998

[30] Foreign Application Priority Data

Mar. 25, 1997 [JP] Japan ................................ 9-072172

[51] Int. Cl.[6] .................................................. G07F 11/12
[52] U.S. Cl. ............................................ 221/11; 221/104
[58] Field of Search .................................. 221/2, 3, 7, 11, 221/10, 14, 17, 92, 104, 105, 106, 103, 108; 364/479.05

[56] References Cited

U.S. PATENT DOCUMENTS 5,096,371 3/1992 Mojden et al. ............................ 221/11

5,569,353 10/1996 Zodrow ................................... 221/104

Primary Examiner—Kenneth W. Noland
Attorney, Agent, or Firm—Wenderoth, Lind & Ponack, L.L.P.

[57] ABSTRACT

An injection drug dispensing system which can quickly dispense injection drug includes a control unit and an injection drug dispenser of the type that requires drugs to be stored in order. The dispenser has a plurality of storage units each including a plurality of cassettes in which are stored many drugs. Each storage unit has an intermediate container into which drugs discharged from the cassettes are collected. The control unit creates a table for drug dispensing data, registers the dispensing data by the numbers attached to the data, and creates a queue in a register for determining the order in which drugs are discharged into the intermediate containers. Drugs can thus be concurrently dispensed into the intermediate containers.

10 Claims, 15 Drawing Sheets

FIG. 6

| DISPENSING DATA NO. | DRUG CODE | DRUG NAMES | STORAGE UNIT NO. | STORAGE CASSETTE NO. | INTERMEDIATE CONTAINER NO. | DISPENSED NO. |
|---|---|---|---|---|---|---|
| 1 | 0001 | DRUG A | 1 | 001 | 1 | 1 |
| 2 | 0002 | DRUG B | 1 | 021 | 2 | 1 |
|  | 0003 | DRUG C | 1 | 041 | 3 | 1 |
| 3 | 0003 | DRUG C | 1 | 041 | 3 | 3 |
| 4 | 0001 | DRUG A | 2 | 041 | 3 | 5 |
|  |  |  |  | 011 | 1 | 6 |
| ‥ | ‥ | ‥ | ‥ | ‥ | ‥ | ‥ |

FIG. 11

| DISPENSING DATA NO. | DRUG CODE | DRUG NAMES | DISPENSER NO. | STORAGE CASSETTE NO. | NUMBER OF RUN-OUT |
|---|---|---|---|---|---|
| 4 | 0001 | DRUG A | 1 | 001 | 5 |
| .. | .. | .. | .. | .. | .. |

FIG. 12

```
------- <RUN-OUT DISPENSE NO. 00004> -------
UNIT NO.-CASSETTE NO.    DRUG NAMES    NUMBER OF RUN-OUT
     01-001                DRUG A              5
---------------------------------------------
```

INJECTION DRUG DISPENSING SYSTEM

BACKGROUND OF THE INVENTION

This invention relates to an injection drug dispensing system used e.g. in a hospital to dispense injection drugs in ampules or vials per prescriptions.

Drug preparation assisting systems are now used in many hospitals and pharmacies to help pharmacists to prepare drugs with higher efficiency and accuracy. The injection drug dispensing system shown in FIG. 15 is one of such assisting systems.

As shown, this dispenser system has a main conveyor 1, a bucket stocker 2 provided at the upstream end of the main conveyor 1, and a bucket discharging lifter 3 provided at the downstream end. Along the main conveyor 1 between the stocker 2 and the lifter 3, the dispensing system further includes dispensers 4 and 5 for dispensing injection drugs (hereinafter simply referred to as drugs) and a printer 6 for printing injection prescriptions.

The bucket stocker 2 supplies buckets 7 one by one onto the main conveyor 1. The main conveyor 1 is a conveyor (such as a roller conveyor) for feeding buckets 7 through the dispensers 4, 5 and the printer 6 to the bucket discharging lifter 3.

The dispenser 4 is of a type that requires drug items to be put in order, while the dispenser 5 asks no such orderly arrangement of drug items. Either dispenser has a plurality of cassettes 8 for storing different kinds of drugs separately from one another, and dispenses designated kinds of drug items by a designated number from a corresponding cassette 8.

As shown in FIG. 16, the dispenser 4 may include four drawer type storage units 9 each having a plurality of cassettes 8 arranged in a row.

At its bottom, each cassette 8 of each storage unit 9 has a discharge port 10. Near the port 10, a discharge roller 11 having a groove-shaped cutout is provided. A longitudinal belt conveyor 12 is provided under the cassettes 8 of each storage unit 9. Every time the discharge roller 11 in each cassette 8 rotates once, one drug item in the cassette 8 is discharged onto the belt conveyor 12.

An intermediate container 13 is provided at the downstream end of each longitudinal conveyor 12 to collect drug items a discharged. Each intermediate container 13 has an openable bottom cover 14. While not shown, a transverse conveyor extends under the intermediate containers 13 of the storage units 9.

The transverse conveyor has its delivery end disposed over the main conveyor 1. Drug items a collected in each container 13 are dropped onto the transverse conveyor by opening the cover 14, fed to the delivery end of the transverse conveyor, and dropped into a bucket 7 being fed on the main conveyor 1.

Either one or both of the dispensers 4, 5 may be used in the system. Also, if there are a large quantity of drug items to prepare, a plurality of such dispensers 4 and/or 5 may be installed along a longer main conveyor 1.

The printer 6 prints prescription data on drug items discharged from the dispensers 4, 5 and puts printouts into the corresponding buckets 7.

The bucket discharging lifter 3 has a bucket storage rack 16. Buckets 7 on the main conveyor 1 are picked up and put in the rack 16 by the lifter 17.

The units 1–6 of this conventional dispensing system are controlled by a computer 19 connected to the system through a control unit 18.

The computer 19 is connected to e.g. a host computer in a hospital. Every time dispensing data are received from the host computer, one bucket 7 is deposited on the conveyor 1 from the bucket stocker 2.

The computer 19 then activates the dispensers 4,5 to put prescribed drug items into the bucket 7 on the conveyor 1 and controls the printer 6 to print prescription information and put the printout into the bucket. At the delivery end of the conveyor 1, the bucket 7 is picked up and loaded into the rack 16 by the lifter 3.

An operator inspects each of the buckets 7 in the rack 16 for any missing or damaged drug items by consulting the prescriptions in the buckets.

On ordinary weekdays, hospital pharmacists prepare drugs to be administered to inpatients for the next day. But on Fridays or any other workday before a holiday, they have to prepare drugs for the next two, three or more days. On such days, they curse the conventional slow-speed dispensers.

Reasons why the conventional dispensing systems are slow in operating speeds are listed below:

(1) Slow dispensing speed

Of the two types of dispensers 4, 5, the dispenser 4, which requires drug items to be put in order, is especially slow in operating speed because dispensing data have to be written every time a drug item is discharged into an intermediate container. If drugs for a particular patient have to be supplied from a plurality of storage units, drugs in one intermediate container have to be discharged after drugs in another intermediate container have been discharged. This further prolongs the processing time.

(2) Finding any missing item is a time-consuming task.

At the inspection station, an operator has to count the number of drugs in each bucket and calculate in his head the number of any missing drug items, if any, by subtracting the actual number of drugs in each bucket from the number of drugs printed on the prescription.

(3) Once the system is stopped, a long time is needed before restart.

If an operator finds out that any item is missing, he has to stop the entire system. Once the system is stopped, the operator has to remove all the drugs and prescriptions remaining in the dispensers, printer and conveyors by opening the system case before restart. This of course prolongs the operating time. Further, the restart procedure itself takes a rather long time.

(4) Drugs tend to get jammed and broken.

Especially in a dispenser of a type in which drugs have to be arranged in order, drugs tend to get jammed and broken (such as on belt conveyors and in intermediate containers). Thus, the system has to be frequently stopped to remove such jammed or broken drug items. Drugs thus cannot be dispensed quickly enough.

An object of this invention is to provide an injection drug dispensing system which can increase the drug dispensing speed of a dispenser of a type in which drugs have to be stored in order therein, and which can prevent drug exhaustion error, reduce jamming and breakage of drugs, and which can quickly correct system failure.

SUMMARY OF THE INVENTION

According to the present invention, there is provided an injection drug dispensing apparatus comprising a feed path, a bucket supply stocker provided at the upstream end of the feed path for supplying buckets onto the feed path, a bucket discharging lifter provided at the downstream end of the feed path, a dispenser for dispensing injection drugs into the buckets being fed on the feed path, and an injection prescription printer for printing out and discharging prescriptions into the buckets on the feed path, the dispenser and the printer being provided between the bucket supply stocker and the bucket discharging lifter; the dispenser being a dispenser of the type in which drug items are stored in an orderly manner and comprises a plurality of storage units each having a plurality of cassettes each accommodating a plurality of drug items, each of the storage units including intermediate containers into which drugs discharged from the respective cassettes are collected, the dispenser being capable of dispensing injection drugs concurrently into a bucket through the respective intermediate containers by processing a plurality of dispensing data.

Thus, for example, even if drugs for one patient are stored in a plurality of storage units, it is possible to dispense these drugs simultaneously through a plurality of intermediate containers. Drugs can thus be dispensed quickly and efficiently.

If the number of drugs to be dispensed from the dispenser based on the dispensing data is greater than a predetermined number, drugs may be dispensed separately in a plurality of batches into the intermediate containers. If a large quantity of drugs are dispensed simultaneously in a single batch, drugs tend to be broken by getting jammed and colliding against each other. According to this invention, since drugs dispensed simultaneously are collected in separate intermediate containers, they are less likely to get jammed or broken. The abovementioned predetermined value is determined experimentally or empirically according to the shape of the apparatus used.

Also, drugs of the same kind may be stored in a plurality of dispensers and if drugs in one of the dispensers run out, drugs may be dispensed from another dispenser. If drugs run out in one dispenser, another dispenser which stocks the same kind of drugs as the first dispenser can be activated to dispense drugs from this dispenser, thereby eliminating the necessity to stop the entire system.

Also, any dispenser that contains no drugs may be registered and drugs may be dispensed from one of the dispensers that is not on the register. Once drugs run out in one dispenser (first dispenser) and the same kind of drugs are dispensed from a second dispenser, drugs of this kind may be dispensed from the second dispenser thereafter, thereby eliminating the necessity to check if the first dispenser is empty every time drugs of this kind are ordered. Drugs can thus be dispensed more quickly.

Other features and objects of the present invention will become apparent from the following description made with reference to the accompanying drawings, in which:

BRIEF DESCRIPTION OF THE DRAWINGS

FIGS. 6 and 7 show the operation of the first embodiment;

FIGS. 11 and 12 show the operation of the second embodiment;

DETAILED DESCRIPTION OF THE PREFERRED EMBODIMENT

Embodiments of this invention will now be described with reference to the drawings. In the following description, the elements used in the prior art of FIGS. 15 and 16 are designated by the same numerals and not described again.

Figure 15:
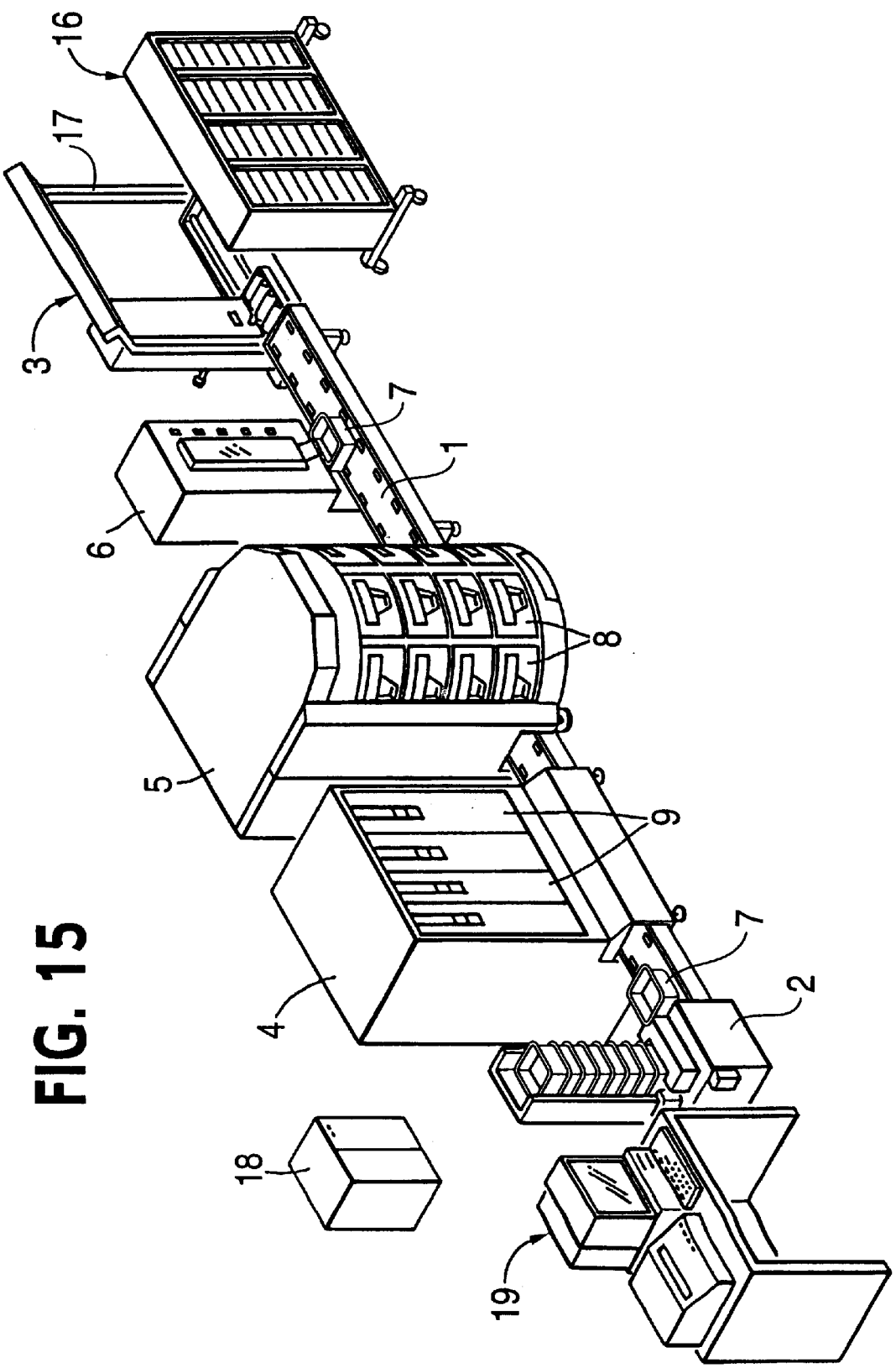
FIG. 15 is a perspective view of an injection drug dispensing system.
Figure 16:
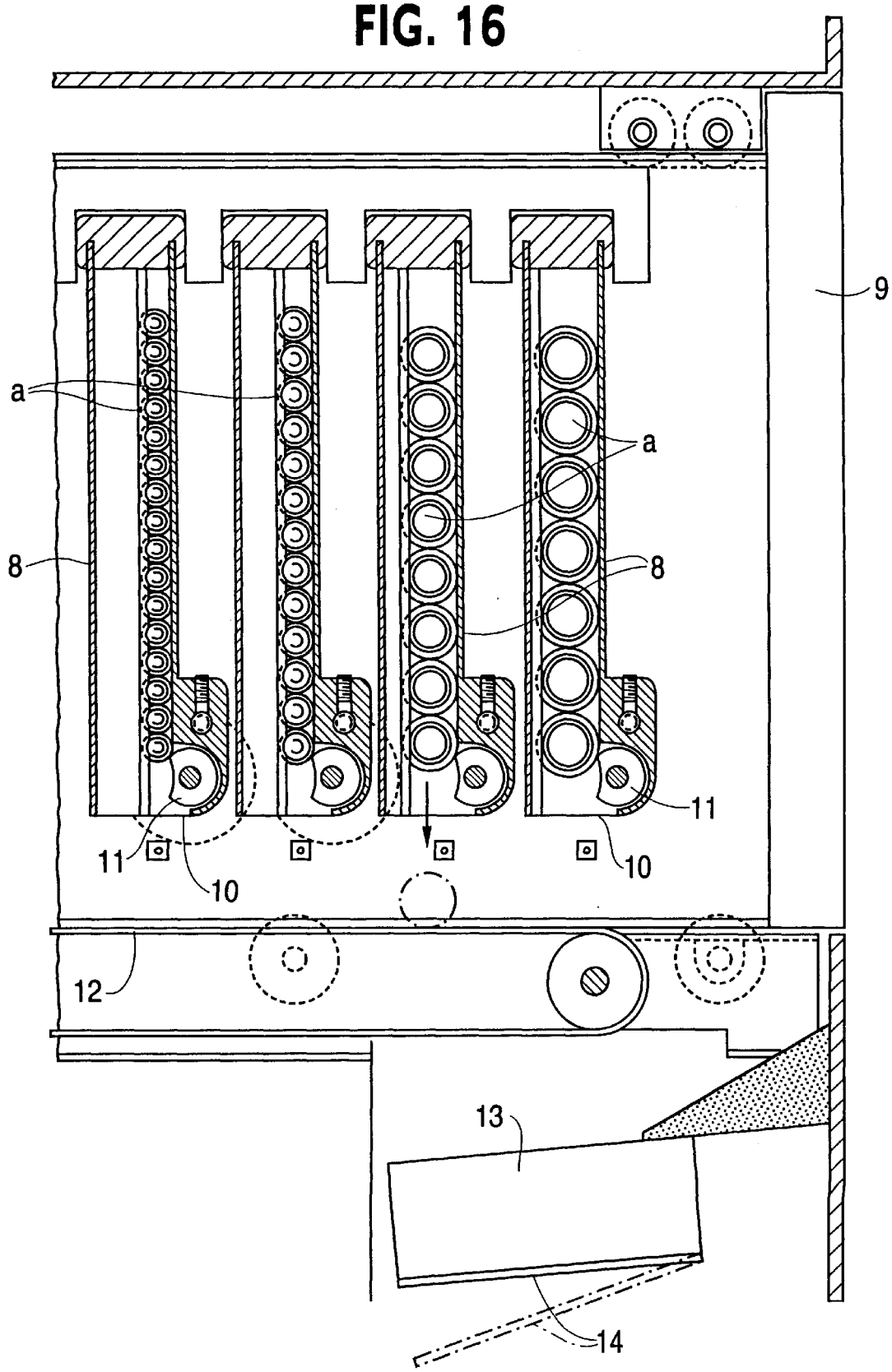
FIG. 16 is a sectional view of a dispenser of the type that requires drugs to be stored in order.

Like the conventional dispensing system of FIG. 15, the present system comprises a main conveyor 1, a bucket stocker 2 at the upstream end of the conveyor 1, a bucket discharging lifter 3, dispensers 4 and 5 and a printer 6 provided along the conveyor 1 between the stocker 2 and the lifter 3. The units 1–6 are connected to a computer 19 through a control unit 18.

Figure 1:
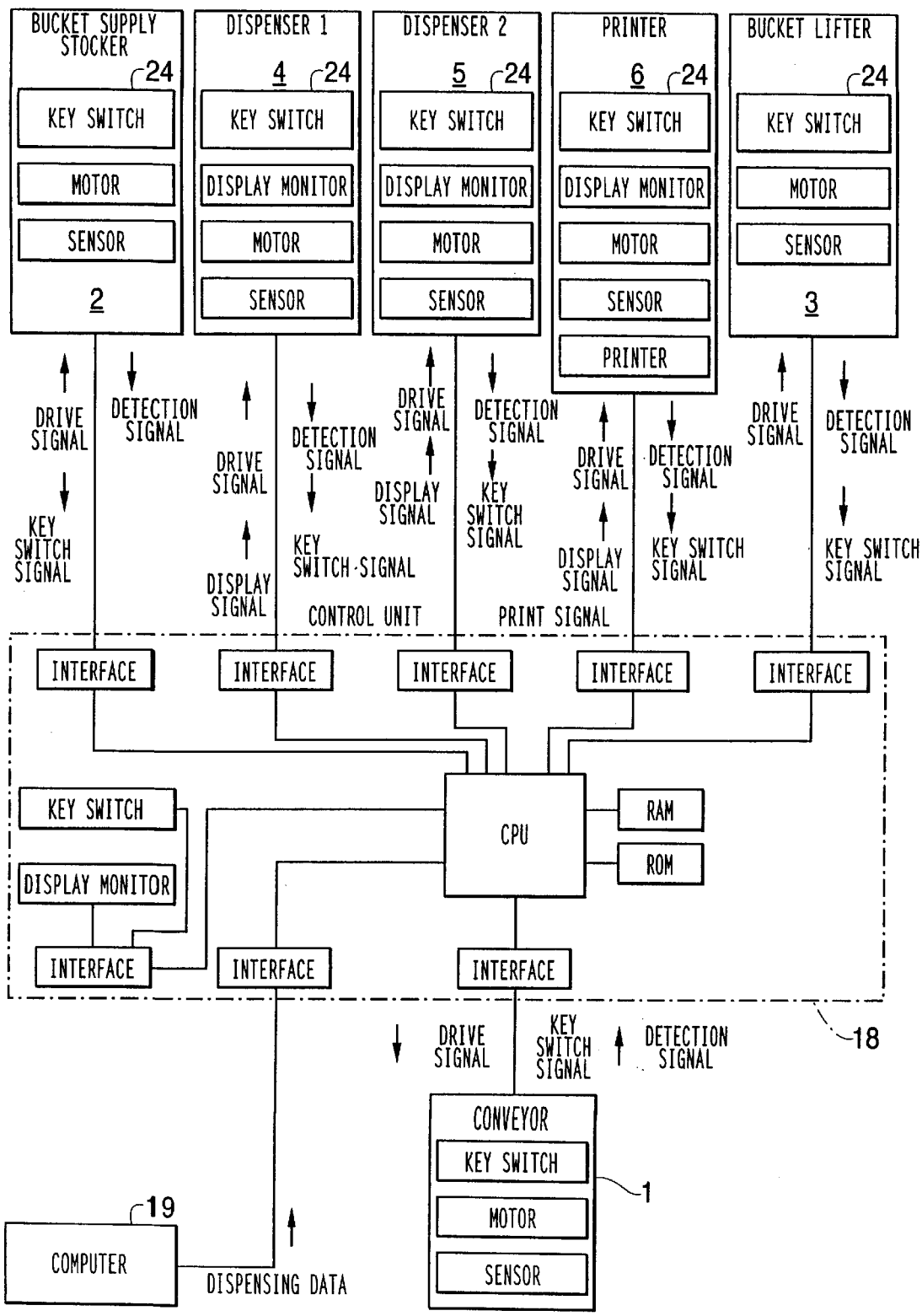
FIG. 1 is a block diagram of an embodiment.

As shown in FIG. 1, the control unit 18 comprises a CPU, ROM, RAM, interfaces, display monitor and key switches.

CPU is connected to ROM and RAM and also connected through external interfaces to the units 1–6 and their sensors to control the units 1–6 based on the signals from the respective sensors according to a program stored in the ROM. Data necessary in dispensing drugs are temporarily stored in the working memory or RAM.

A CPU is further connected through internal interfaces to the display monitor and the key switch so that any change in control data and data on control status can be displayed on the monitor. The control unit 18 has a serial interface (such as RS-232C) which can be connected to the computer 19.

The computer 19 is connected to a host computer in a hospital by a LAN. The computer 19 receives injection prescription data, converts them to dispensing data and transmits the thus converted data to the control unit 18, which, based on the received data, dispenses drugs.

The computer 19 may be a general-purpose personal computer with a keyboard and a display. It is typically connected to a host computer in a hospital through a LAN but may be a stand-alone computer into which injection prescription data can be directly entered.

Figure 2:
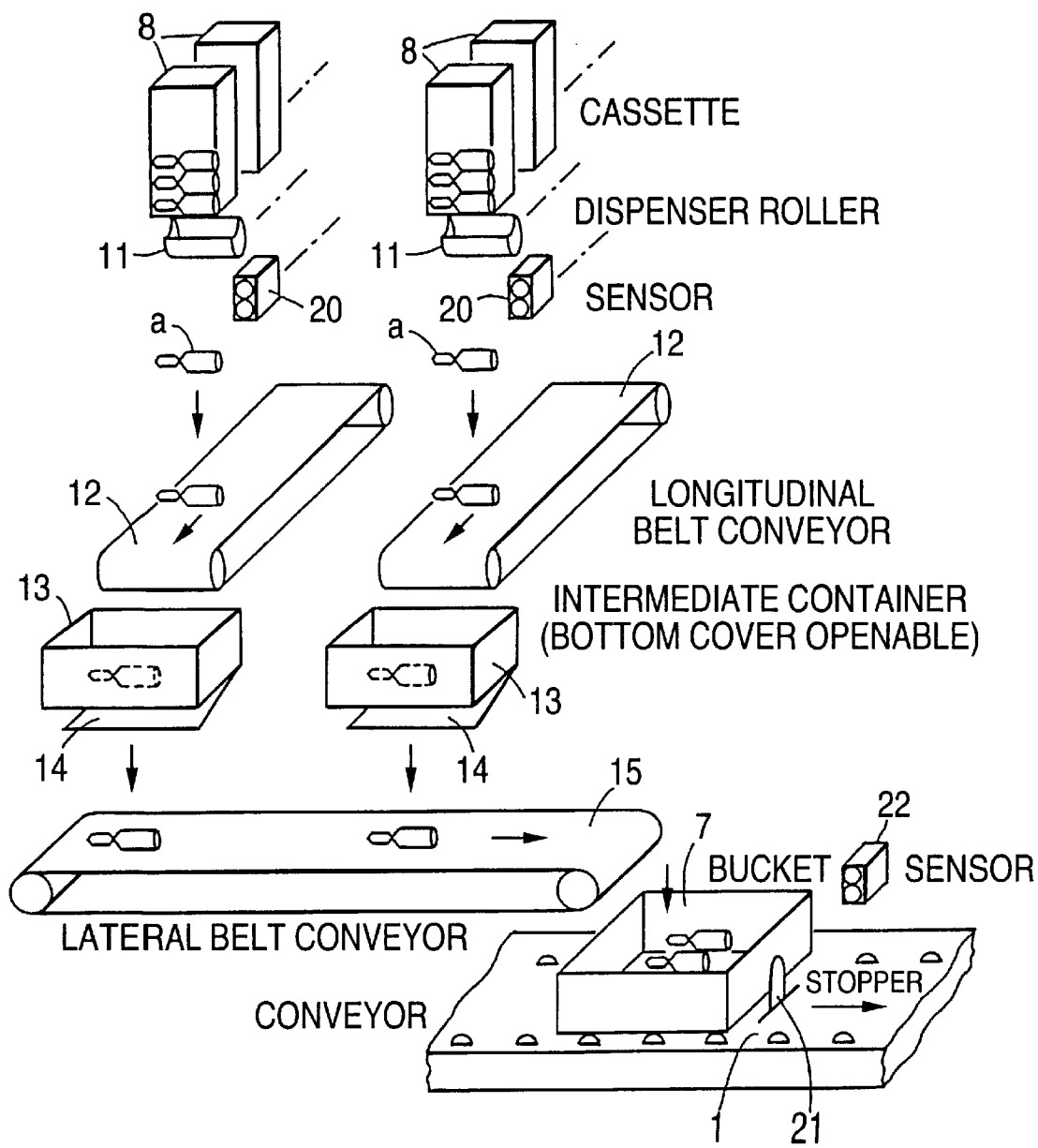
FIGS. 2 and 3 show the operation of the injection drug dispensing apparatus according to the invention.

As shown in FIG. 2, the dispenser 4 of this embodiment has a reflection type light sensor 20 under the discharge roller 11 of each cassette 8 to detect drugs a discharged from each cassette 8.

A stopper 21 is provided at the portion of the main conveyor 1 right under the delivery end of the transverse conveyor 15. The control unit 18 activates e.g. a solenoid to protrude the stopper 21 from the top surface of the conveyor 1, thus stopping a bucket 7 right under the delivery end of the conveyor 15.

A reflection type sensor 22 (or any other sensor such as a proximity sensor or a microswitch) is provided near the stopper 21 to detect a bucket 7.

Drug items a are stored in the cassettes 8. Every time the discharge roller 11 of each cassette 8 rotates once, one drug item is discharged onto the longitudinal belt conveyor 12. The reflecting type light sensors 20 detect drugs discharged from the respective cassettes 8. If no drug is detected by a particular sensor 20, the corresponding roller 11 is rotated again. If no drug is detected by the sensor 20 after the roller 11 is rotated by several turns, the computer determines that there are no drugs remaining in the particular cassette.

Drug items discharged onto the conveyors 12 drop into the intermediate containers 13. In this state, their covers 14 are closed.

By the time drugs are collected in the containers 13, the stopper 21 is protruded. When the sensor 22 detects that a bucket 7 fed on the conveyor 1 is stopped by the stopper 21, the bottom covers 14 are opened to drop the drugs in the containers 13 onto the transverse belt conveyor 15. The conveyor 15 is driven for a predetermined time to drop the drugs thereon into the bucket 7.

When all the necessary drugs are put in the bucket 7, the stopper 21 is retracted to feed the bucket to the next station, i.e. the dispenser 5.

Another stopper 21 and sensor 22 are provided right under the discharge port of the dispenser to stop the bucket and put the drugs discharged from the dispenser 5 into the bucket.

Figure 3:
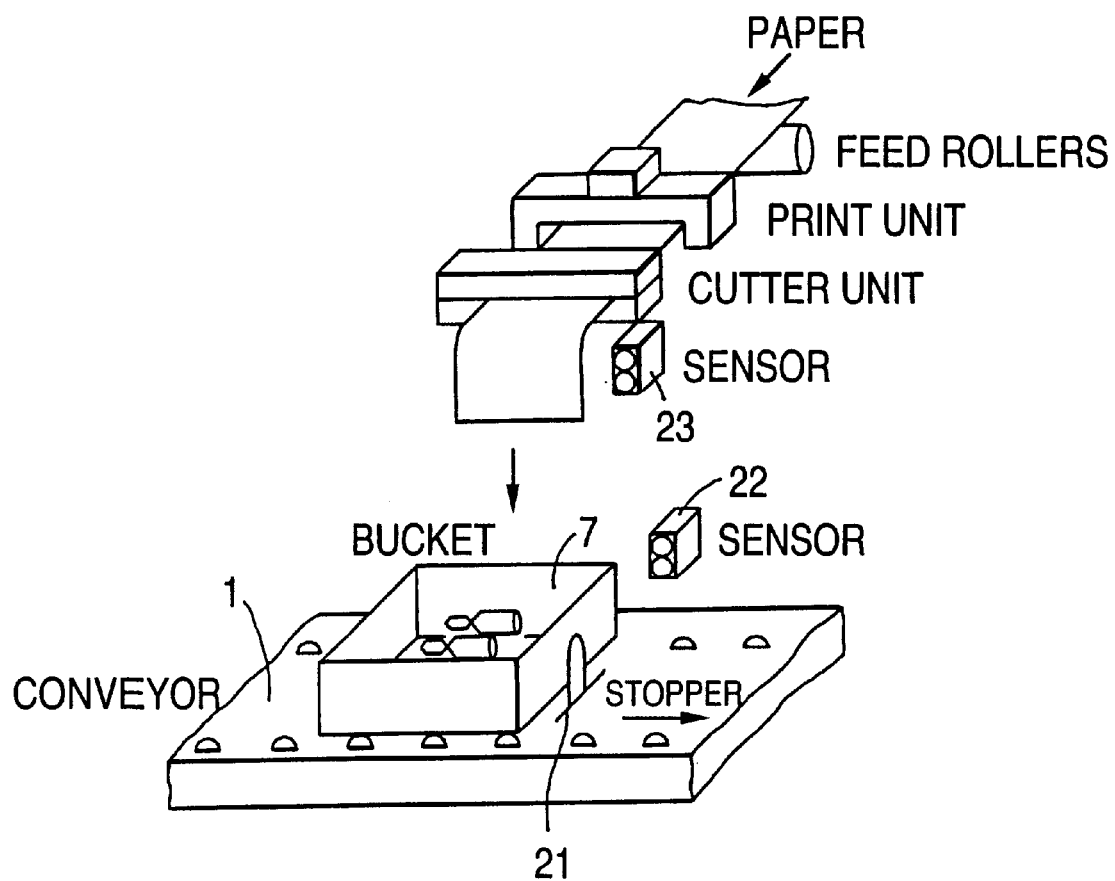

A similar stopper 21 is also provided under the printed paper discharge end of the printer 6. The printer of this embodiment comprises, as shown in FIG. 3, a printing unit having a print head and a cutter unit. With a bucket 7 stopped right under the printer 6, necessary data are printed on a web of paper fed by feed rollers in the printer unit, and the printed portion of the paper is cut in the cutter unit and put in the bucket. A light sensor 22 provided near the stopper 21 detects a bucket stopped by the stopper.

A light sensor 23 provided under the cutter detects printed paper being discharged from the cutter unit. Near the discharge port of the bucket stocker 2, another sensor is provided to detect buckets being discharged from the stocker. If no bucket is detected by the sensor, the computer determines that there are no buckets remaining in the stocker. Near its inlet, the bucket discharging lifter 3 has a sensor for detecting a bucket that has been fed to a position at which it can be picked up by the lifter. The rack 16 also has a sensor for detecting that a bucket on the lifter has been put in the rack 16.

Each of the units 1–6 has a key switch 24. Both the key switches 24 and the sensors 20, 22, 23 are connected to the control unit 18 and controlled in a cordinated manner by the control unit 18 so that drugs can be dispensed smoothly.

First Embodiment

An arrangement with which it is possible to increase the speed at which drugs are dispensed from the dispenser 4 shall be described as the first embodiment.

Figure 4:
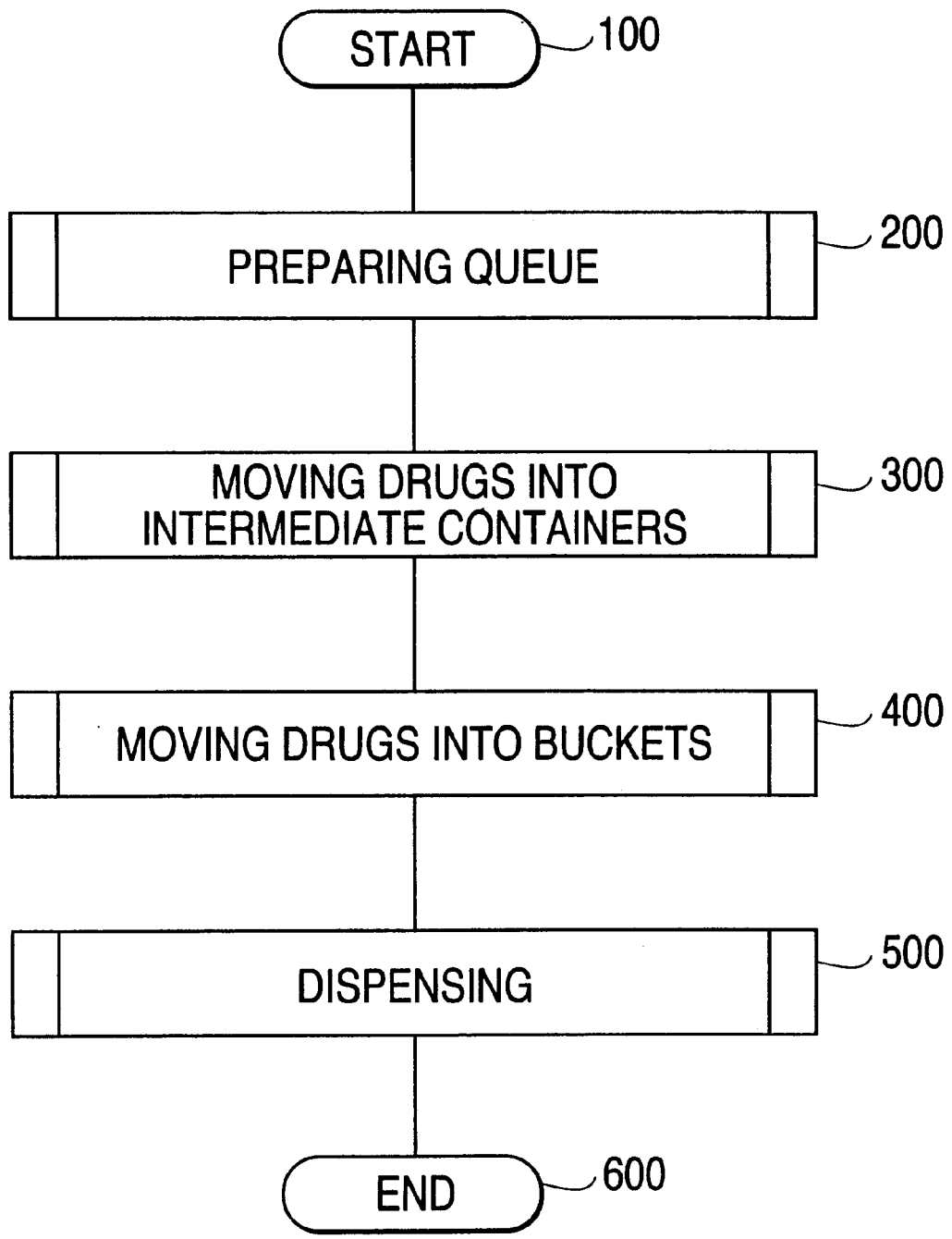
FIGS. 4 and 5 are flowcharts of a first FIG. 1 apparatus.

That is, in this arrangement, the control unit 18 controls the dispenser as shown in FIG. 4 to more quickly dispense drugs from the dispenser without fail by dispensing necessary drugs while preventing drugs from getting jammed and broken.

Figure 5:
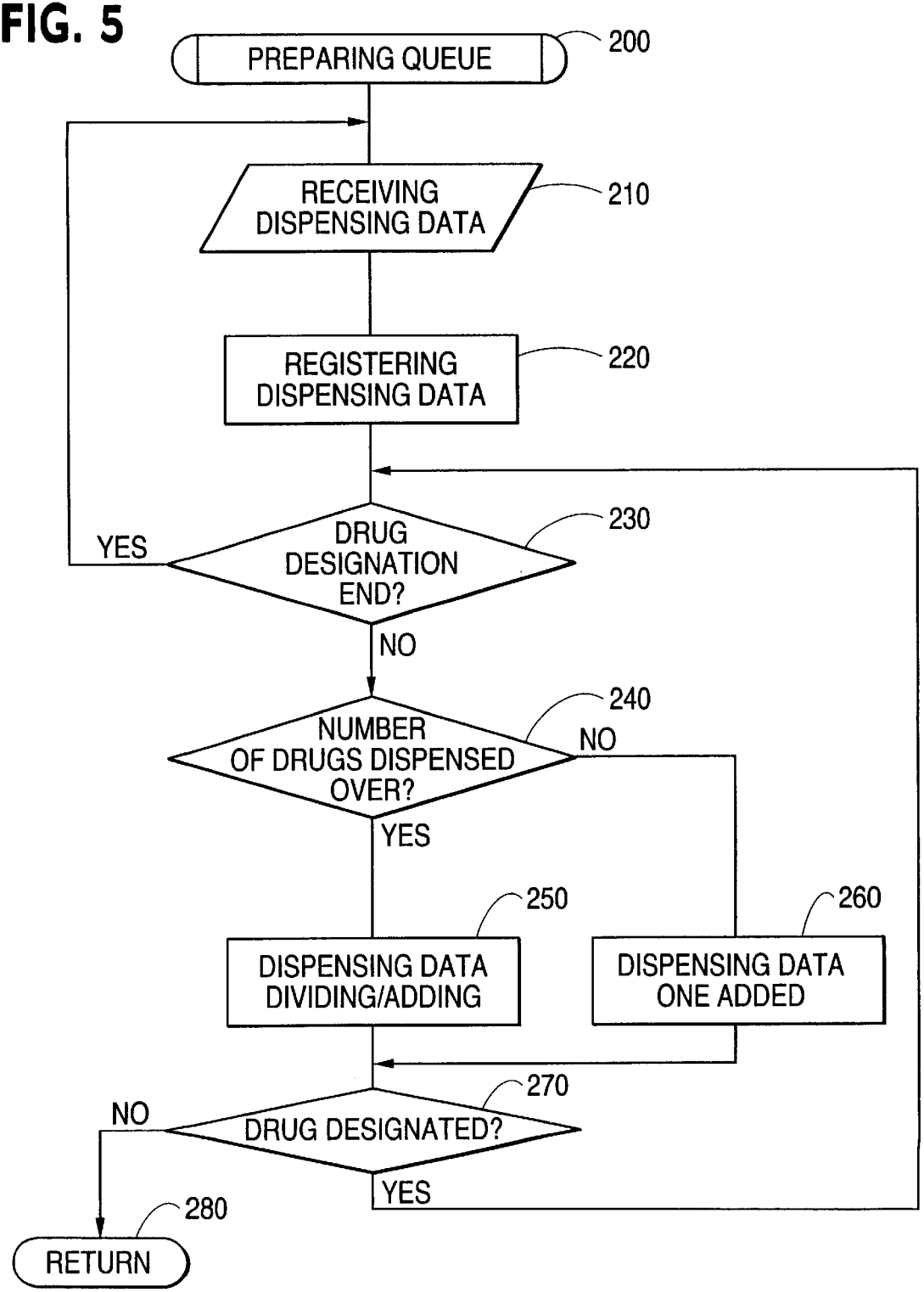

This arrangement comprises the steps of queuing (Step 200), moving drugs into the intermediate containers (300), and moving drugs into respective buckets (400). After starting (100), when dispensing data are received from the computer 19 in the queuing step 200 (FIG. 5), the control unit 18 creates a table on dispensing data in the working area of RAM as shown in FIG. 6.

The table includes dispensing data numbers, drug codes, drug names, storage unit numbers and storage cassette numbers that are arranged according to the order in which respective drugs are dispensed.

When a single kind of drug is designated in a particular prescription, the control unit 18 enters the necessary data in a single line (as with the data number 1 in the table). For a prescription in which a plurality of kinds of drugs are designated, the necessary data for the respective kinds of drugs are entered in a plurality of separate lines under the same data number (e.g. data number 2).

The drug storage units 9, cassettes 8 and intermediate containers 13 are all numbered and their numbers are stored in the ROM. Thus, the control unit knows which number of cassette 8 in which number of unit 9 corresponds to which intermediate container 13.

In the embodiment, the table of FIG. 6 is created by the control unit 18 but may be created by the computer 19 and transmitted to the unit 18.

Referring to the table of FIG. 6, when data corresponding to data number 1 are entered, a single drug item A is dispensed from the number 001 cassette 8 in the number 1 storage unit 9 into the number 1 intermediate container 13.

When number 2 data are entered, a single drug item B is dispensed from the number 021 cassette 8 in the number 1 storage unit 9 into the number 3 intermediate container 13, and simultanously, a single drug item C is dispensed from the number 041 cassette 8 in the number 1 storage unit 9 into the number 3 intermediate cassette 13.

Figure 7:
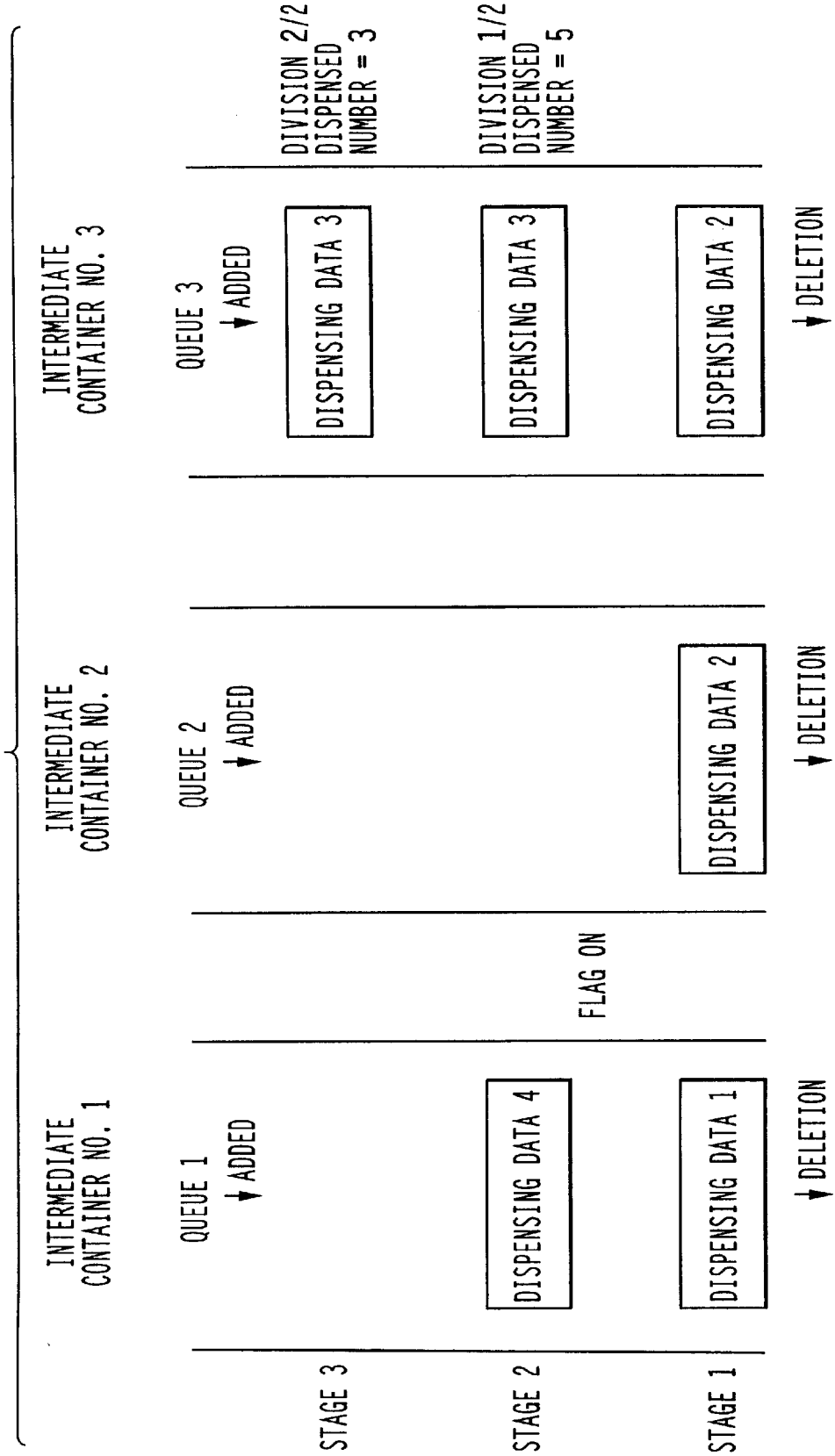
Figure 8:
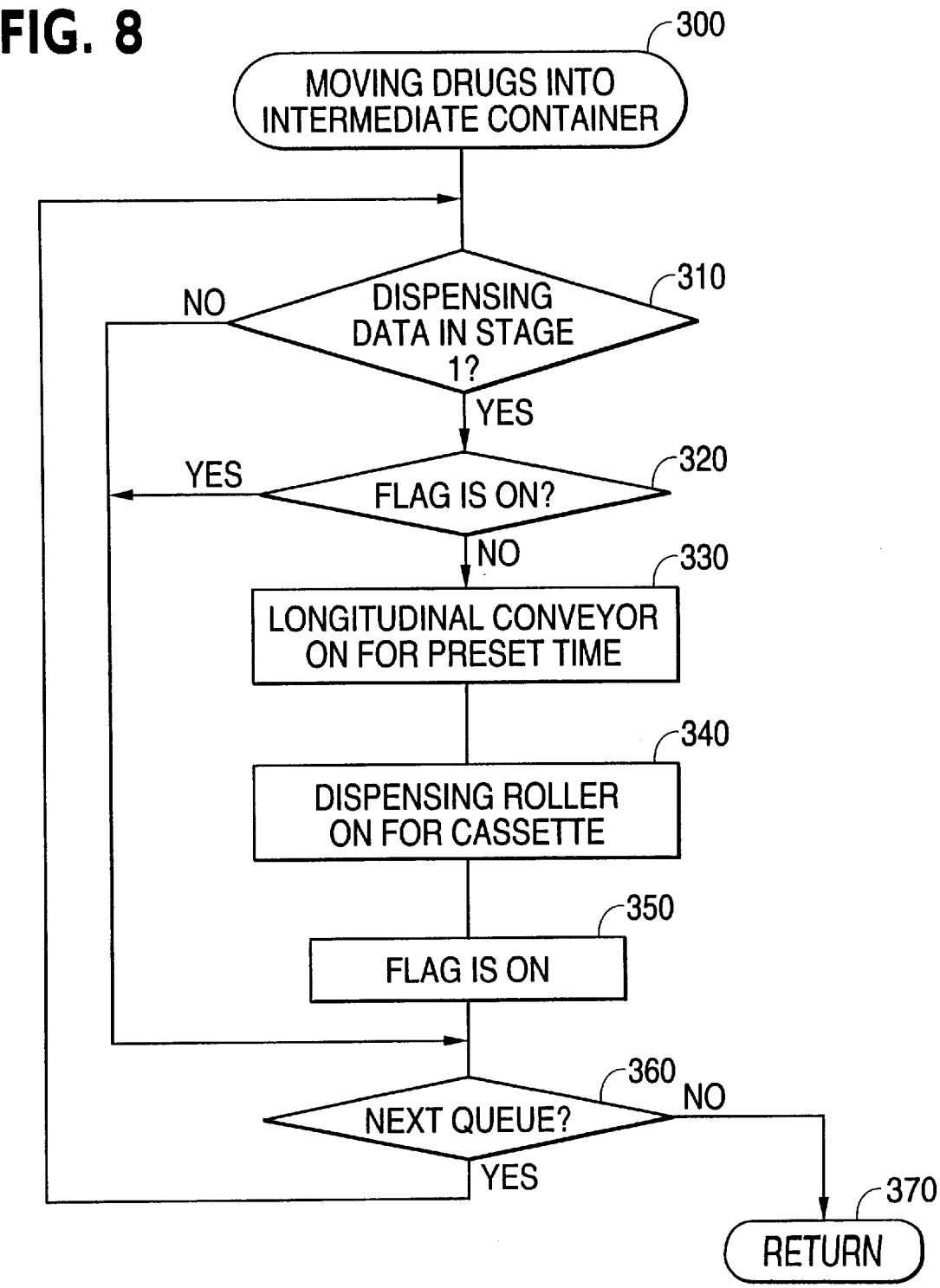
FIGS. 8 and 9 are flowcharts of the first embodiment.

Thus, it is possible to simultaneously dispense a plurality of drugs through a plurality of intermediate containers 13 according to the queue in a register as shown in FIG. 7.

In this arrangement, the control unit compares the number of drugs to dispense with a predetermined number (Step 240), and if the former is greater, dispenses drugs not simultaneously but separately in a plurality of lots (250).

For example, if the above predetermined number is five, eight drug items designated by the data number 3 in FIG. 6 are divided into groups of five and three drug items and a corresponding queue is formed to determine which group to dispense first as shown in FIG. 7.

By limiting the number of drugs dispensed at a time, it is possible to prevent jamming, collision and breakage of drugs.

If the number of drug items for a particular data number is below the upper limit, the above data are added to the queue.

The control unit searches for any new drug data (270), and if new data are found, repeats the above routine (270), and if no new data are found, returns to the main routine (280) to execute the step of moving drugs into the next intermediate container (300).

In this step (300), the control unit checks if there are dispensing data in the stage 1 of the queue (see FIG. 7) (310). A flag is provided for each intermediate container 13. When drugs are put into a particular container 13, the flag for this container is turned on, and when drugs are discharged therefrom, the corresponding flag is turned off. If dispensing data are found, the control unit checks if the flag for the designated intermediate container is on (320).

If the flag for the designated intermediate container 13 is off, which means that the container is empty, the control unit activates the corresponding longitudinal belt conveyor 12 for a predetermined time period based on e.g. a timer (330), and activates the corresponding roller 11 based on the queue to discharge designated drug items by a designated number onto the longitudinal conveyor 12 (340). When this is done, the control unit turns on the flag for the designated container (350), checks if there are any data for the next queue (360), and if there are, repeats the steps 310–350. If no data are found, the program returns to the main routine (370) to put drugs into a bucket 7 (400).

If no data are found in stage 1 of the queue in step 310, or if the flag is on in step 320, the control unit checks if there are data in the queue and if no data are found, the program returns to the main rountine (370). If data are found, the control unit repeats steps 310–350.

Figure 9:
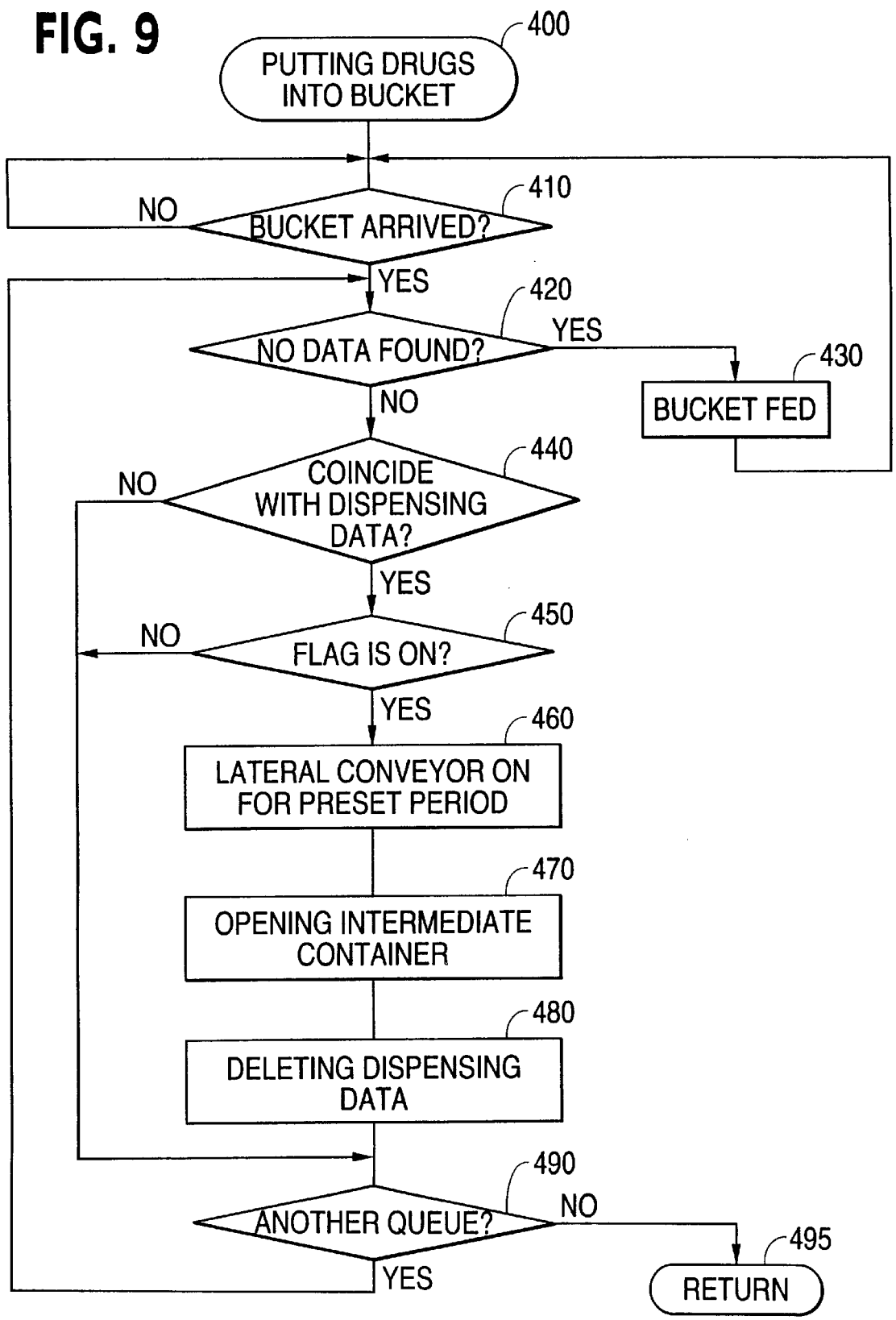

In step 400, shown in FIG. 9, the sensor 22 checks if a bucket 7 is at the dispensing position (410). The control unit searches for dispensing data corresponding to the number of the bucket 7 waiting (420) to make sure that no drugs that are supposed to be put in the bucket remain in the queue.

If no data are found in step 420, the bucket 7 is fed downstream (430). If data are found in step 420, the control unit checks if the dispensing data number in stage 1 matches the number of the bucket 7 again (440) to make sure that the drugs remaining truly belong in the bucket 7. If the drugs remaining belong in the bucket 7, the control unit checks if the drugs are in the intermediate container 13 by checking if the flag is on (450). If the drugs are actually in the container 13, the lateral belt conveyor 15 is activated for a predetermined time based on e.g. a timer (460), and then the drugs are emptied from container 13 into the bucket 7 by opening the bottom cover 14 (470). The control unit then deletes the dispensing data (480), searches for another queue (490), and if a queue is found, repeats steps 420–480. If no queue is found, the bucket 7, now filled with drugs, is fed downstream (430).

If no dispensing data are found in step 440 and the flag is off in step 450, the control unit searches for another queue (490), and if a queue is found, repeats steps 420–480 as long as dispensing data are found to dispense all the necessary drugs into the bucket. When all the necessary drugs have been put in the bucket, i.e. when no dispensing data are found any more, the bucket 7, now filled with the required drugs, is fed downstream (430). This cycle is repeated for every prescription.

According to the invention, data for a plurality of kinds of drugs can be processed concurrently. Drugs can thus be dispensed quickly. If the number of drugs is greater than a predetermined number, drugs are dispensed separately in a plurality of lots to prevent jamming and breakage of drugs. This shortens the possible downtime of the device, improves the working efficiency and increases the dispensing speed.

Second Embodiment

In the second embodiment, drug items of the same kind are stored in a plurality of dispensers 4, 5 or in a plurality of storage units 9, so that if drugs in one dispenser or storage unit run out, the same kind of drugs can be dispensed from another dispenser or storage unit. Drugs can thus be dispensed more quickly.

Figure 10:
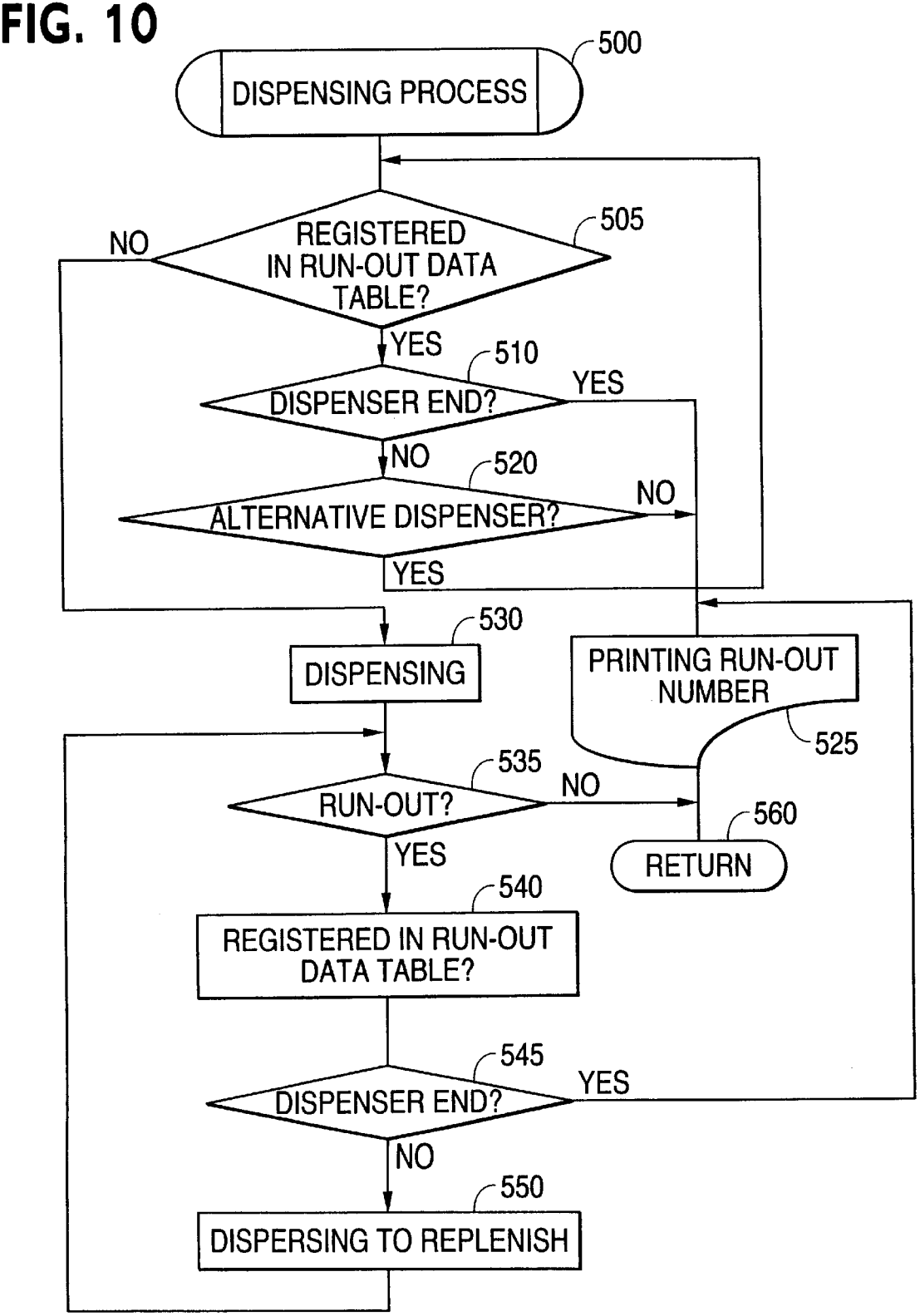
FIG. 10 is a flowchart of a second embodiment.

In this embodiment, a data table as shown in FIG. 11 is used. Suppose drugs are being dispensed from the dispenser 4. As shown in FIG. 10, at the start of the dispensing program (500), the control unit checks if a storage unit number corresponding to a particular dispensing data number is registered in the data table, and checks the dispensing data of the particular dispensing data number to determine if the storage unit 9 was already empty in the previous dispensing step (505). The control unit then determines if it is necessary to dispense drugs from the other dispenser 5 (510). If it is (520), the dispenser 4 is registered in the data table (510), and drugs are now dispensed from the dispenser 5 (530).

By performing similar steps (535 to 550) to check if the dispenser 5 is empty, the dispensing speed can be increased.

By registering the emptiness, it is possible to directly dispense drugs from the non-empty dispenser 5. Drugs can thus be dispensed quickly.

If one of the dispensers or storage units becomes empty, the number of the storage unit or cassette that has run out of drugs, the name of drugs to be supplied into the now empty unit or cassette, and the number of drugs may be printed by a printer 6 (525) as shown in FIG. 12 to let an operator know of the fact that a certain storage unit or cassette has become empty so that he can quickly take whatever measures are necessary. Drugs can thus be dispensed more quickly.

This process may be performed after Step 400 in FIG. 4 (moving the drugs into bucket). This increases the dispensing speed in the first embodiment.

In this embodiment, drug items of the same kind are stored in both dispensers 4, 5. But instead, drug items of the same kind may be stored in two or more of the storage units 9 or different cassettes 8 of the same storage unit 9.

Third Embodiment

In the third embodiment, key switches 24 are used.

Figure 13:
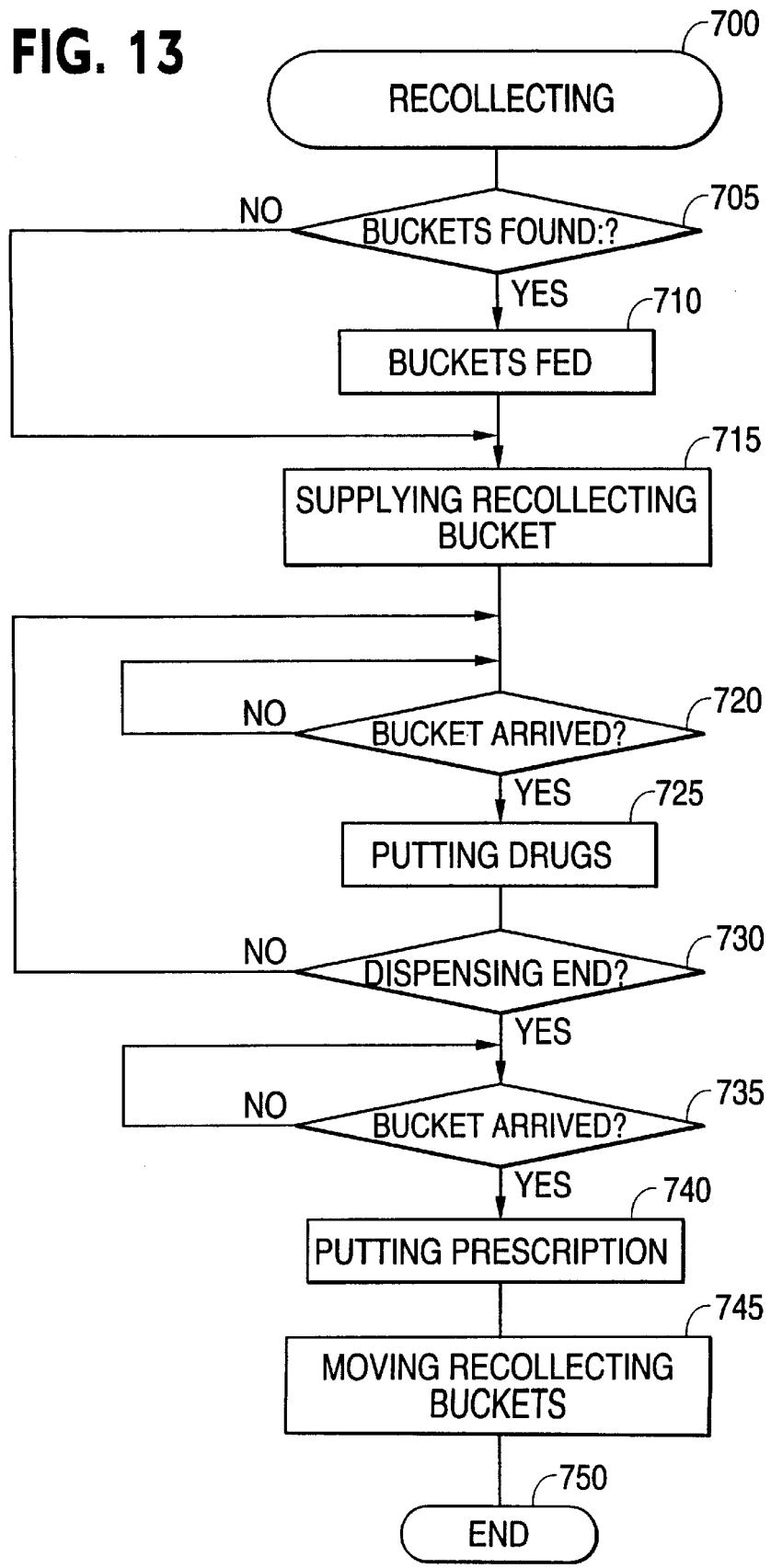
FIG. 13 is a flowchart of a third embodiment.

In this embodiment, if anything abnormal is detected in the apparatus, a corresponding key switch 24 is closed to run the program shown in FIG. 13 to recollect any unnecessary drugs and injection prescriptions produced due to the failure of the apparatus.

Specifically, in step 700 of the program of FIG. 13, the sensor 22 checks if buckets 7 are on the conveyor 1. If buckets 7 are found on the conveyor 1, all of them are moved onto the lifter 3 and discharged (710). Then, a recollecting bucket 7 is put on the conveyor 1 from the bucket stocker 2 (715). When the sensor 22 detects the arrival of the recollecting bucket 7 at the dispenser 4 or 5 (720), the control unit activates the stopper 21 to stop the bucket 7. In e.g. the dispenser 4, drugs are put into the bucket 7 (725) by activating the longitudinal belt conveyors 12, intermediate containers 13 and lateral conveyors 15. Similarly, drugs are discharged into the bucket from the dispenser 5. When all the drugs in the dispensers 4 and 5 have been put into the bucket 7 (730), the stopper 21 is unlocked to move the bucket 7 to the printer 6. When the sensor 22 detects the arrival of the bucket 7 at the printer 6 (735), the stopper 21 stops the bucket 7, and an injection prescription that has been half-printed in error is discharged into the bucket (740). When this is done, the control unit unlocks the stopper 21 to feed the bucket onto the lifter 3 and discharge it (745). This completes the recollecting routine (750).

If an operator notices anything abnormal in the apparatus, he closes one of the key switches 24 provided for the respective units 1–6. In response, a bucket 7 is deposited on the conveyor 1 from the bucket stocker 2, and drugs and half-printed injection prescriptions are collected into the bucket. Thus, all the drugs and half-printed prescriptions remaining in the apparatus can be completely discharged into the bucket. This prevents lowering of drug dispensing speed.

Fourth Embodiment

The fourth embodiment is a drug collecting process at the startup of the apparatus.

Figure 14:
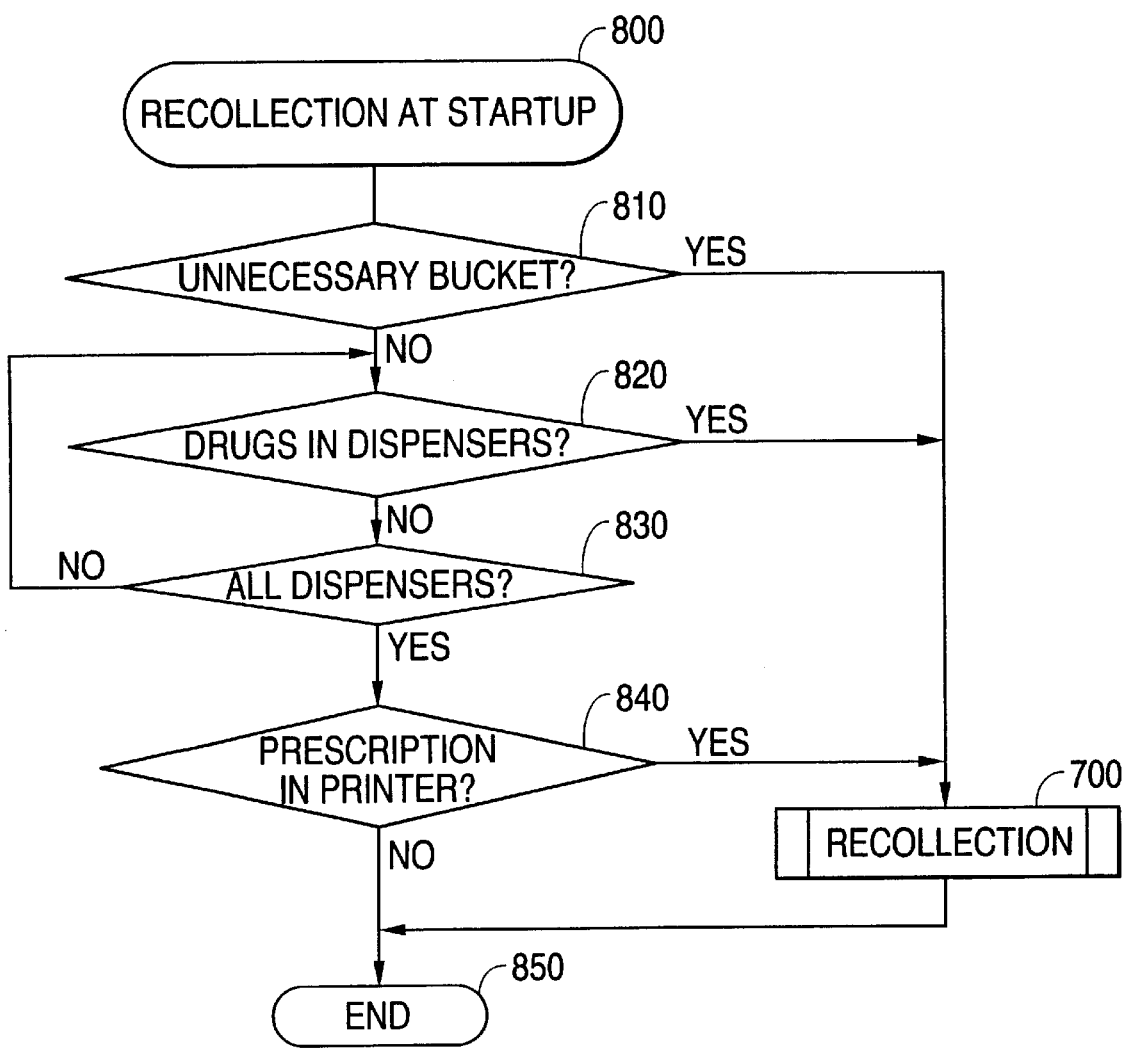
FIG. 14 is a flowchart of a fourth embodiment.

In this process, as shown in FIG. 14, the control unit searches for any unnecessary bucket 7 on the conveyor 1 or a prescription remaining in the printer 6 at the startup of the apparatus. If such a bucket and/or prescription is found, a bucket 7 is deposited on the conveyor 1 from the bucket stocker 2 to collect such a bucket and/or prescription.

Specifically, in step 800 of the program of FIG. 14, the sensor 22 searches for a bucket 7 in the same manner as in the third embodiment (810). The control unit then searches for any drugs remaining in the dispensers 4 and 5. Specifically, in the dispenser 4, the control unit searches for drugs remaining on the longitudinal belt conveyors 12 and lateral belt conveyors 15 and in the intermediate containers 13 by moving the conveyors 12 and 15 for a predetermined time with the bottom covers 14 of the intermediate containers 13 open and detecting drugs with the sensor 22. Additional sensors may be provided in the intermediate containers or at other areas where drugs are collected. Thus, any unnecessary drugs in the dispensers 4 and 5 are detected (830). Similarly, any unnecessary prescription remaining in the printer 6 is detected by a sensor (840). If even a single drug item or a single prescription is found, the program 700 is executed (850).

According to the present invention, the computer finds out and collects any unnecessary drugs and injection prescriptions. Thus, it is possible to dispense drugs quickly while reducing operators' work loads.

According to this invention, a plurality of intermediate containers in a dispenser of the type in which drug items are stored in an orderly manner are activated concurrently based on a plurality of dispensing data. Thus, it is possible to dispense drugs quickly.

In the arrangement in which drugs are dispensed separately in a plurality of batches based on a predetermined upper limit value, it is possible to prevent jamming and breakage of drugs.

In the arrangement in which drugs of the same kind are stored in a plurality of dispensers or storage units, run-out errors are preventable. This improves the working efficiency of the entire apparatus and the drug dispensing speed.

Drugs that have not been discharged due to run-out errors may be printed out so that an operator can resupply drugs based on this data. With this arrangement, it is possible to reduce operators' work loads and increase the drug dispensing speed.

Even if the apparatus is stopped in an emergency situation or due to a blackout or at the startup of the apparatus, it is possible to collect any drugs and prescriptions that have been left in the apparatus. This further reduces operators' work loads and increases the drug dispensing speed.

What is claimed is:

1. An injection drug dispensing apparatus comprising a feed path, a bucket supply stocker provided at the upstream end of said feed path for supplying buckets onto said feed path, a bucket discharging lifter provided at the downstream end of said feed path, a dispenser for dispensing injection drugs into the buckets being fed on said feed path, and an injection prescription printer for printing out and discharging prescriptions into the buckets on said feed path, said dispenser and said printer being provided between said bucket supply stocker and said bucket discharging lifter;

said dispenser being a dispenser of the type in which drug items are stored in an orderly manner and comprises a plurality of storage units each having a plurality of cassettes each accommodating a plurality of drug items, each of said storage units including intermediate containers into which drugs discharged from the respective cassettes are collected, said dispenser being capable of dispensing injection drugs concurrently into a bucket through the respective intermediate containers by processing a plurality of dispensing data.

2. An injection drug dispensing apparatus as claimed in claim 1 wherein if the number of drugs to be dispensed from said dispenser based on said dispensing data is greater than a predetermined number, drugs are dispensed separately in a plurality of batches into said intermediate containers.

3. An injection drug dispensing apparatus comprising a feed path, a bucket supply stocker provided at the upstream end of said feed path for supplying buckets onto said feed path, a bucket discharging lifter provided at the downstream end of said feed path, a plurality of dispensers for dispensing injection drugs into buckets being fed on said feed path, and an injection prescription printer for printing out and discharging prescriptions into the buckets on said feed path, said dispenser and said printer being provided between said bucket supply stocker and said bucket discharging lifter; wherein drugs of the same kind are stored in said plurality of dispensers and wherein if drugs in one of said dispensers run out, drugs are dispensed from another dispenser.

4. An injection drug dispenser as claimed in claim 3 wherein any dispenser that contains no drugs is recorded and wherein drugs are dispensed from one of said dispensers that has not been recorded as containing no drugs.

5. An injection drug dispenser as claimed in claim 4 wherein if drugs in one of said dispensers run out, said printer is adapted to print data based on the fact that drugs have run out in said one of said dispensers.

6. An injection drug dispenser as claimed in claim 3 wherein if drugs in one of said dispensers run out, said printer is adapted to print data based on the fact that drugs have run out in said one of said dispensers.

7. An injection drug dispensing apparatus comprising a feed path, a bucket supply stocker provided at the upstream end of said feed path for supplying buckets onto said feed path, a bucket discharging lifter provided at the downstream end of said feed path, a dispenser for dispensing injection drugs into buckets being fed on said feed path, and an injection prescription printer for printing out and discharging prescriptions into the buckets on said feed path, said dispenser and said printer being provided between said bucket supply stocker and said bucket discharging lifter;

wherein if anything abnormal is detected while drugs are being dispensed, a bucket is deposited on said feed path by said bucket supply stocker, and the bucket is fed on said feed path to collect injection drugs and printed out paper.

8. An injection drug dispensing apparatus as claimed in claim 7, wherein each of the respective units of said injection drug dispensing apparatus is provided with a key switch, and wherein if any of said key switches is closed, a bucket is deposited on said feed path by said bucket supply stocker, and is moved on said feed path to collect injection drugs and printed out paper.

9. An injection drug dispensing apparatus as claimed in claim 7, wherein at the startup of the apparatus, any unnecessary drugs remaining in said dispenser, or any prescription remaining in said printer are looked for, and if one or both of them are detected, a bucket is deposited on said feed path by said bucket feed stocker, and moved on the feed path to collect them.

10. An injection drug dispensing apparatus as claimed in claim 7, wherein at the startup of the apparatus, any unnecessary bucket on said feed path is looked for, and if such a bucket is found on said feed path, a bucket is deposited on said feed path by said bucket supply stocker and moved on said feed path to collect the bucket on said feed path.

* * * * *